(12) United States Patent
Nashery et al.

(10) Patent No.: US 10,119,636 B2
(45) Date of Patent: Nov. 6, 2018

(54) TRAPEZOIDAL THREAD FORM HAVING A WEAR INDICATOR AND HIGH PRESSURE CONNECTION FITTING COMPRISING SAME

(71) Applicant: EMERSON PROCESS MANAGEMENT REGULATOR TECHNOLOGIES, INC., McKinney, TX (US)

(72) Inventors: Khashayar A. Nashery, Dallas, TX (US); Douglas J. Scheffler, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 1532 days.

(21) Appl. No.: 13/853,152

(22) Filed: Mar. 29, 2013

(65) Prior Publication Data
US 2013/0257037 A1 Oct. 3, 2013

Related U.S. Application Data

(60) Provisional application No. 61/618,382, filed on Mar. 30, 2012.

(51) Int. Cl.
*F16L 15/06* (2006.01)
*F16L 15/08* (2006.01)

(52) U.S. Cl.
CPC .............. *F16L 15/06* (2013.01); *F16L 15/08* (2013.01)

(58) Field of Classification Search
CPC .................................. F16L 15/06; F16L 15/08
USPC ....... 411/13, 14, 8, 411, 424, 418, 419, 420, 411/421; 285/333, 334, 93
See application file for complete search history.

(56) References Cited

U.S. PATENT DOCUMENTS

| | | | | |
|---|---|---|---|---|
| 2,096,937 A | * | 10/1937 | McManus | F16B 25/0021 411/418 |
| 3,069,961 A | * | 12/1962 | Baubles | F16B 33/02 285/334 |
| 3,224,316 A | * | 12/1965 | Grikscheit | F16B 31/02 411/13 |

(Continued)

OTHER PUBLICATIONS

International Search Report and Written Opinion for Application No. PCT/US2013/034065, dated Sep. 12, 2013.

(Continued)

*Primary Examiner* — David Bochna
(74) *Attorney, Agent, or Firm* — Marshall, Gerstein & Borun LLP (57) ABSTRACT

A trapezoidal thread form includes a thread having a trapezoidal cross-sectional shape, the thread including an apex surface, two side surfaces, and a valley; and a thread wear indicator formed in one of the apex surface and one of the side surfaces. The thread wear indicator may include a v-shaped channel formed in one of the apex surface and one of the side surfaces or the thread wear indicator may include a series of material layers, each layer having a physical characteristic that is different from an adjacent material layer. The thread wear indicator indicates excessive or unsafe thread wear when the v-shaped channel is indistinguishable from the apex surface or the side surface, or when a first layer wears sufficiently to show a second layer.

15 Claims, 6 Drawing Sheets

(56) References Cited

U.S. PATENT DOCUMENTS

| | | | | |
|---|---|---|---|---|
| 3,937,119 | A * | 2/1976 | Ernst | F16B 25/0026 411/418 |
| 5,681,059 | A * | 10/1997 | Mackie | B63B 21/502 285/334 |
| 6,009,611 | A | 1/2000 | Adams et al. | |
| 6,086,303 | A * | 7/2000 | Fluckiger | F16B 5/0275 411/418 |
| 6,412,831 | B1 * | 7/2002 | Noel | F16L 15/004 285/333 |
| 6,481,760 | B1 * | 11/2002 | Noel | E21B 17/042 285/333 |
| 6,905,149 | B2 * | 6/2005 | DeLange | F16L 15/004 285/334 |
| 6,979,163 | B2 * | 12/2005 | Brletich | F16B 21/084 411/418 |
| 7,014,212 | B2 | 3/2006 | Mallis | |
| 7,331,614 | B2 * | 2/2008 | Noel | F16L 15/001 285/334 |
| 7,513,534 | B2 * | 4/2009 | Noel | F16L 15/004 285/333 |
| 7,520,174 | B2 * | 4/2009 | Clarke | F16B 31/025 411/8 |
| 7,686,350 | B2 * | 3/2010 | Reynolds, Jr. | F16L 15/004 285/334 |
| 8,485,769 | B2 | 7/2013 | Rosenkranz et al. | |
| 2004/0130152 | A1 | 7/2004 | DeLange et al. | |
| 2005/0134104 | A1 * | 6/2005 | Simmons | E21D 21/0006 299/31 |
| 2006/0071473 | A1 | 4/2006 | Sivley et al. | |
| 2007/0297873 | A1 * | 12/2007 | Wieser | F16B 1/0071 411/411 |
| 2010/0171305 | A1 * | 7/2010 | Roussie | F16L 15/06 285/333 |
| 2011/0027035 | A1 | 2/2011 | Rosenkranz et al. | |

OTHER PUBLICATIONS

International Preliminary Report on Patentability for International application No. PCT/US2013/034065, dated Oct. 1, 2014.

Chinese Office Action for Application No. 201310115282.5, dated Oct. 9, 2015.

Communication pursuant to Article 94(3) EPC for Application No. 13 716 610.4-1754, dated Jul. 29, 2016.

* cited by examiner

TRAPEZOIDAL THREAD FORM HAVING A WEAR INDICATOR AND HIGH PRESSURE CONNECTION FITTING COMPRISING SAME

BACKGROUND

Field of the Disclosure

The disclosure generally relates to trapezoidal thread forms and more specifically to trapezoidal thread forms having a wear indicator, and pressure connection fittings comprising such thread forms.

Related Technology

Threaded connections are often used to join two members to one another. For example, a nut and bolt may be joined by a threaded connection. Likewise, two pipe sections may be joined by a threaded connection. Threaded connections generally include a male part and a female part. The male part includes threads formed on an outer surface and the female part includes threads formed on an inner surface. The threads include an elevated portion or ridge surrounded on either side by recessed portions or valleys. The elevated portions and recessed portions are generally helical in shape. When connected, the elevated portions of the male threads generally seat within the recessed portions of the female threads. By twisting or turning the male and female parts relative to one another, the elevated portions may be advanced through the recessed portions as the male and female parts advance longitudinally with respect to one another.

The threads themselves may take on many different cross-sectional shapes. For example, common fasteners, such as nuts and bolts, may have a V-shaped thread where the recessed portions have a cross sectional shape that looks like a "V" and the elevated portions have a cross sectional shape that looks like an inverted "V." While V-shaped threads may reliably secure a male part to a female part, the V-shape focuses material stresses at the sharp edges, which can lead to failure. Furthermore, the V-shape means that the part of the elevated portion that is seated most deeply within the recessed portion is also the thinnest or weakest part of the thread, which can also lead to failure. Additionally, the sharp peak of the elevated portion is more susceptible to being damaged by impacts, which can deform the top of the elevated portion significantly enough that it cannot seat in the recessed portion.

Another type of thread is the square thread. These threads have a square-shaped cross section. Square threads are generally stronger than V-shaped threads as the elevated portions have a thicker cross section near the ends. While square threads are stronger than V-shaped threads, square threads are more difficult to manufacture and have a relatively short lifespan.

A trapezoidal thread is an improvement over square threads. Trapezoidal threads have a trapezoid-shaped cross section. Trapezoidal threads have high strength, are generally easy to manufacture, and can compensate for wear, which leads to longer life spans. Trapezoidal threads are often used on power screws, or other applications that require strong and accurate connections.

One type of trapezoidal thread is known as an Acme thread. The Acme thread includes a 29° thread angle and a thread height that is half of the pitch. The ridge and valley of the Acme thread are relatively flat, which makes machining the threads easier. The thread also has a wider base, which increases strength of the connection. The Acme thread also allows use of a spilt nut, which can compensate for some thread wear. Due to the thicker bases and wider channels, Acme threads also work well in environments having contaminants, such as dirt, that can get caught between the threads. Acme threads are commonly found on hose end-connection, filling valves, valve stems, and other common locations where quick connection and disconnection is required and/or where large forces may be encountered. These threads are relatively durable, but like any other type of threaded engagement are susceptible to wear.

Any type of thread is susceptible to wear during use. Worn threads can decrease the strength of a threaded connection significantly. Due to the nature of threaded connections, wear is often difficult, or impossible, to detect. As a result, excessively worn threads may go undetected until failure.

SUMMARY

In accordance with one exemplary aspect of the present invention, a trapezoidal thread form includes a thread having a trapezoidal cross-sectional shape, the thread including an apex surface, two side surfaces, and a valley; and a thread wear indicator formed in one of the apex surface and one of the side surfaces.

In accordance with another exemplary aspect of the present invention, a threaded connection includes a male part having an outer thread form, a female part having an inner thread form, and a thread wear indicator disposed on at least one of the outer thread form and the inner thread form, the thread wear indicator providing a visual indication of excessive thread wear.

In further accordance with any one or more of the foregoing aspects, a trapezoidal thread form (or a threaded connection) may further include any one or more of the following preferred forms.

In some preferred forms, the trapezoidal thread form or the threaded connection may include a v-shaped channel formed in one of the apex surface and one of the side surfaces, the thread wear indicator indicating excessive or unsafe thread wear when the v-shaped channel is indistinguishable from the apex surface or the side surface. In other preferred forms, the v-shaped channel may be substantially parallel to a top edge of the thread form or to a side surface of the thread form. In other preferred forms, the v-shaped channel may extend radially outward from a valley in the thread form. In yet other preferred forms, the v-shaped channel may have a depth that is between 5% and 25%, preferably between 10% and 20%, of a thickness or a height of the thread form. In other preferred forms, the thread form may have side surfaces that are angled radially outward with respect to one another. In yet other preferred forms, the side surfaces may be angled between 15° and 45°, preferably between 20° and 40°, and more preferably between 25° and 35°. In other preferred forms, thread wear indicator may include a series of material layers, each layer having a physical characteristic that is different from an adjacent material layer, the thread wear indicator indicating excessive or unsafe thread wear when a first layer wears sufficiently to show a second layer. In yet other preferred embodiments, the physical characteristic is at least one of color, texture, and electrical conductivity.

DETAILED DESCRIPTION

Described herein are several types of trapezoidal threads that include a thread wear indicator. However, the thread wear indicators described herein may be applied to other threaded connections, such as square and V threads in other embodiments.

Thread wear in threaded connections can be an important safety issue. Excess use, abuse and lack of adequate inspection and inspection techniques have lead to incidents where premature wear of the trapezoidal thread profile (e.g., an Acme thread profile) has lead to unexpected fitting separation resulting in accidents, property damage and deaths. Trapezoidal threads are quite common in the liquid propane (LP) gas industry for fuel transfer and have recently come under scrutiny. To reduce the possibility of failure, some refineries require that fuel transfer couplings use refinery hoses that are periodically inspected by the refinery. However, the methods of inspection are generally subjective in nature, relying on the inspectors' experience and visual acuity to determine if the threaded connection is worn. Currently no procedures or products exist to objectively measure thread wear.

The inventors have discovered that a thread wear indicator may be added to trapezoidal thread forms to allow an inspector to objectively determine thread wear by comparing physical grooves on the thread flanks and/or thread peak (i.e., the apex or ridge) to the rest of the thread. In other embodiments, the threads may be plated to a thickness that, once eroded, visually indicates excessive thread wear.

Figure 1:
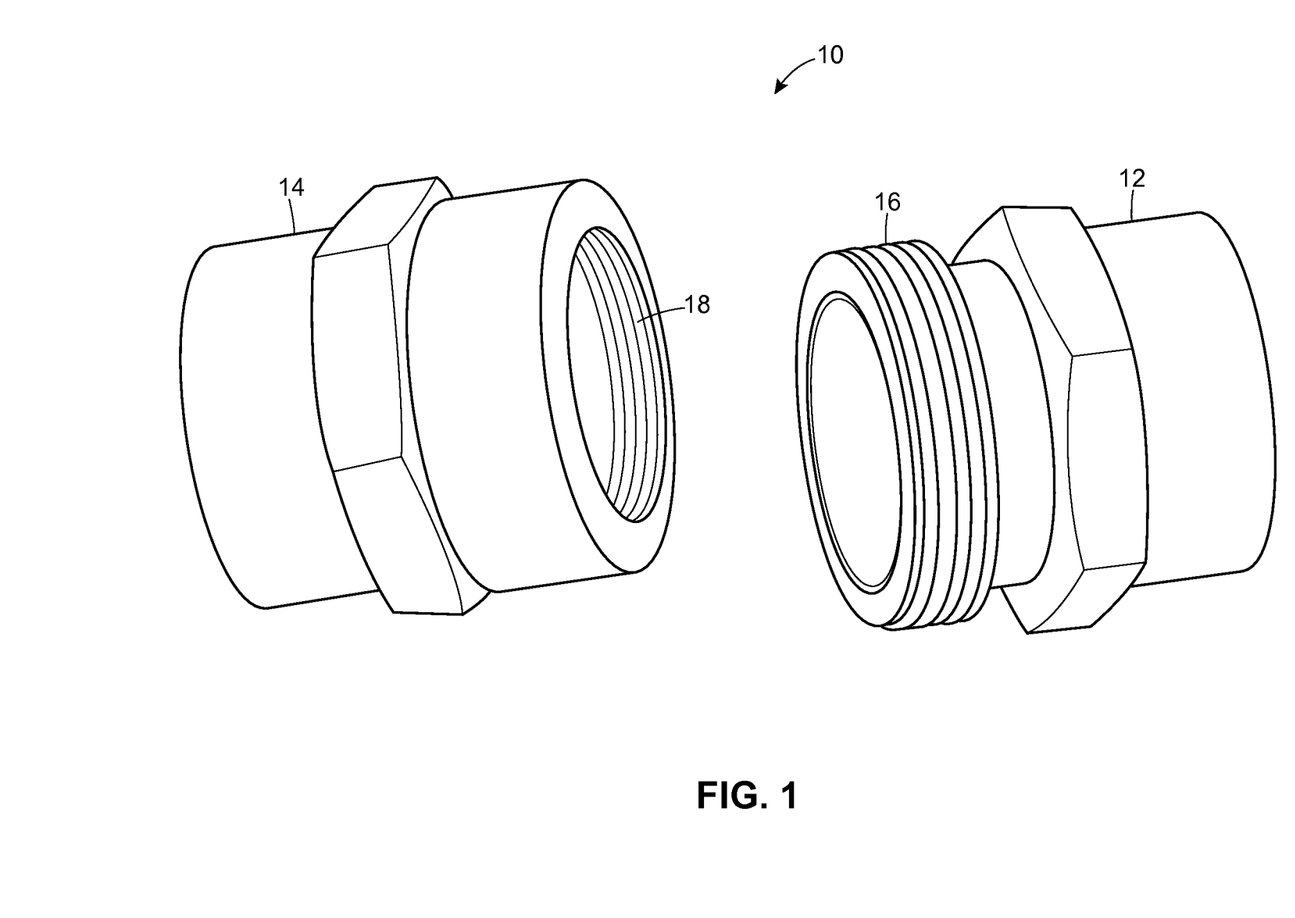
FIG. 1 is a perspective view of a threaded connection between a male part and a female part.

Turning now to FIG. 1, a threaded connection 10 is illustrated. The threaded connection 10 includes a male part 12 and a female part 14. The male part 12 includes an outer threaded portion 16 and the female part 14 includes an inner threaded portion 18. When connecting the male part 12 and the female part 14, the outer threaded portion 16 is joined with the inner threaded portion 18 to secure the male part 12 to the female part 14.

Figure 2:
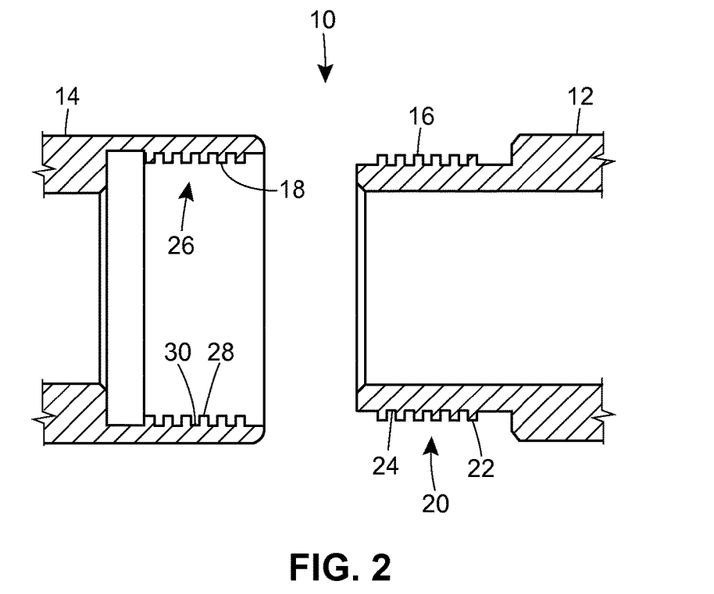
FIG. 2 is a cross-sectional view of the threaded connection of FIG. 1.
Figure 3:
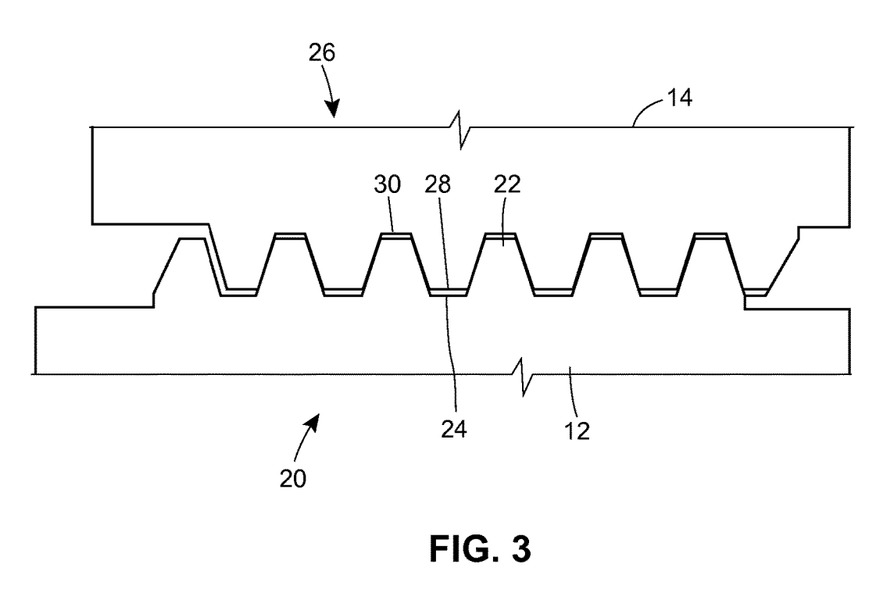
FIG. 3 is a close up cross-sectional view of the threaded connection of FIG. 1, with the male part engaged with the female part.

As illustrated in FIG. 2, the outer threaded portion 16 includes a series of threads 20 that include an outer apex or ridge 22 and an outer recessed portion or valley 24. The inner threaded portion 18 likewise includes a series of threads 26 that include an inner apex or ridge 28 and an inner recessed portion or valley 30. When connected, the outer ridges 22 seat within the inner valleys 30. Similarly, when connected, the inner ridges 28 seat within the outer valleys 24, which results in the male part 12 and the female part 14 being secured to one another, as illustrated in FIG. 3.

Figure 4:
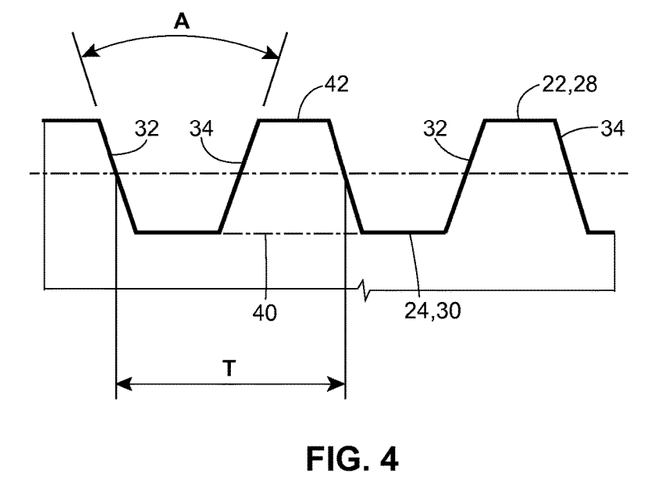
FIG. 4 is a close up cross-sectional view of a section of threads in the threaded connection of FIG. 1.

The outer ridges 22 and the inner ridges 28 have a trapezoidal shape. In one example, as illustrated in FIG. 4, the ridges 22, 28 may be seated between two side surfaces 32, 34 of the valleys 24, 30, when the male part 12 and the female part 14 are connected. The side surfaces 32, 34 may be angled away from one another in a radial direction (i.e., away from the valley 24, 30) by angle A. In the embodiment of FIG. 4, angle A may be approximately 29°. In other embodiments, angle A may be approximately 30°. In yet other embodiments, angle A may preferably be in the range from about 15° to about 45°, more preferably between about 20° and about 40°, and even more preferably between about 25° and about 35°. The thread may have a thickness T that is measured longitudinally and encompasses one complete waveform (i.e., one side surface 32, one valley 24, 30, one ridge 22, 28, and the other side surface 34). The thickness T, when viewed in cross-section, is roughly analogous to a waveform period of the thread form. The angled side surfaces 32, 34 result in a base 40 of the thread form that is wider longitudinally than an apex surface 42 of the thread form.

Figure 5:
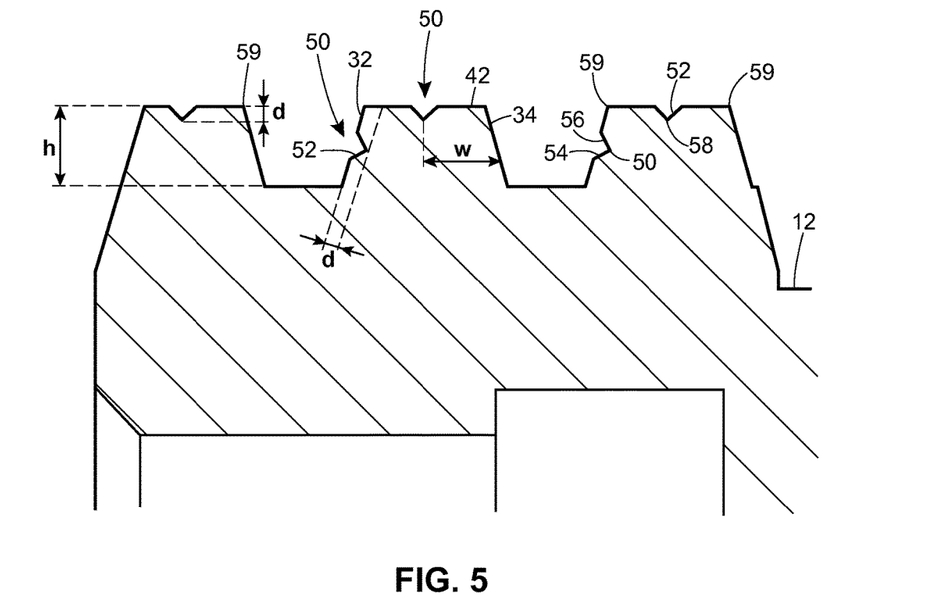
FIG. 5 is close up cross-sectional view of male threads including a thread wear indicator.
Figure 6:
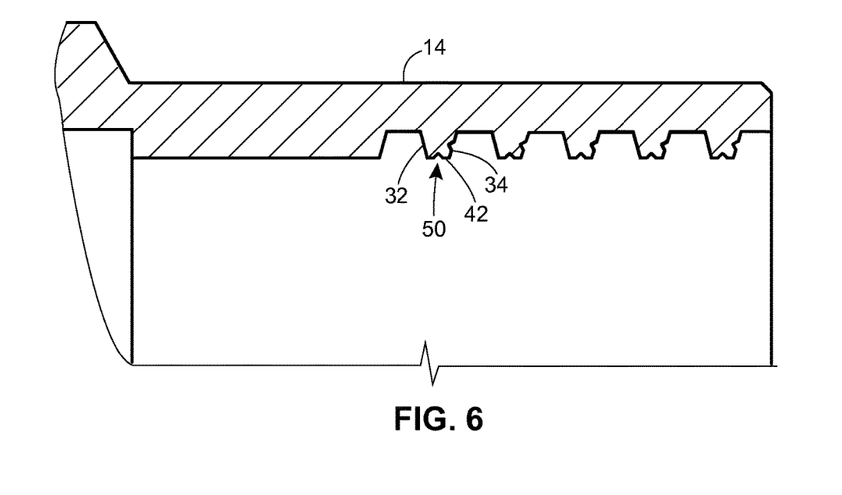
FIG. 6 is a close up cross-sectional view of female threads including a thread wear indicator.

FIGS. 5 and 6 illustrate one embodiment of a trapezoid thread including a thread wear indicator 50. The male trapezoid thread is illustrated in FIG. 5 and the female trapezoid thread is illustrated in FIG. 6. The thread wear indicator 50 may be located along the apex surface 42, or along a side surface 32, 34 of the thread. In the embodiment of FIG. 5, the thread wear indicator includes a v-shaped channel 52 having a first side 54 and a second side 56. The first side 54 and the second side 56 meet at an intersection 58. The intersection 58 is located at a depth or distance d away from either the apex surface 42 or the side surface 32, 34. The distance d is set to correspond to a maximum amount of thread wear that is tolerable for a given use. For example, the distance d may correspond to between 5% and 25% of an overall thickness or height h of the thread, which may be measured from the base 40 to the apex surface 42. The distance d may also correspond to between 5% and 25% of a width w of the thread, which may be measured from the side surface 32, 34 to a center of the thread at a location of the thread wear indicator 50. Preferably, the distance d may correspond to between 10% and 20% of the height h or the width w, respectively. In other embodiments, the thread wear indicator 50 may have other cross-sectional shapes, such as a u-shape, a semi-circular shape, a square-shape, or virtually any other shape that extends inward, into the material forming the thread, from the side surface or the apex surface.

In the embodiment of FIGS. 5 and 6, the thread wear indicator 50 is illustrated as a spiral groove both on the apex surface 42 and on the leading flank or side surface 32 of the threads where wear typically takes place. The spiral groove runs generally parallel to a top edge 59, which is formed at an intersection of the apex surface 42 and one side wall 32, 34. An unacceptable wear condition may be indicated when any of the thread wear indicators 50 become indistinguishable from the surface on which the thread wear indicator 50 is formed (e.g., the apex surface 42 or the side surface 32, 34). In other words, when the thread wear indicator 50 becomes indistinguishable (e.g., the surface appears flat, as if the thread wear indicator 50 has disappeared or become barely perceptible), excessive wear has taken place and the threaded connection is no longer safe to use.

Figure 7:
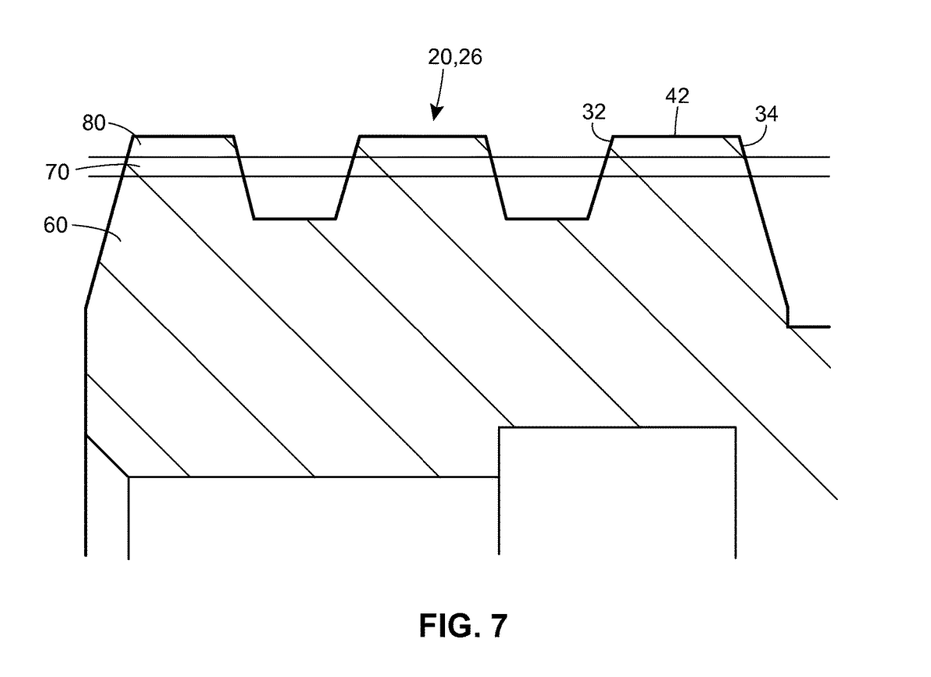
FIGS. 7-9 are close up cross-sectional views of threads including another embodiment of a thread wear indicator.
Figure 8:
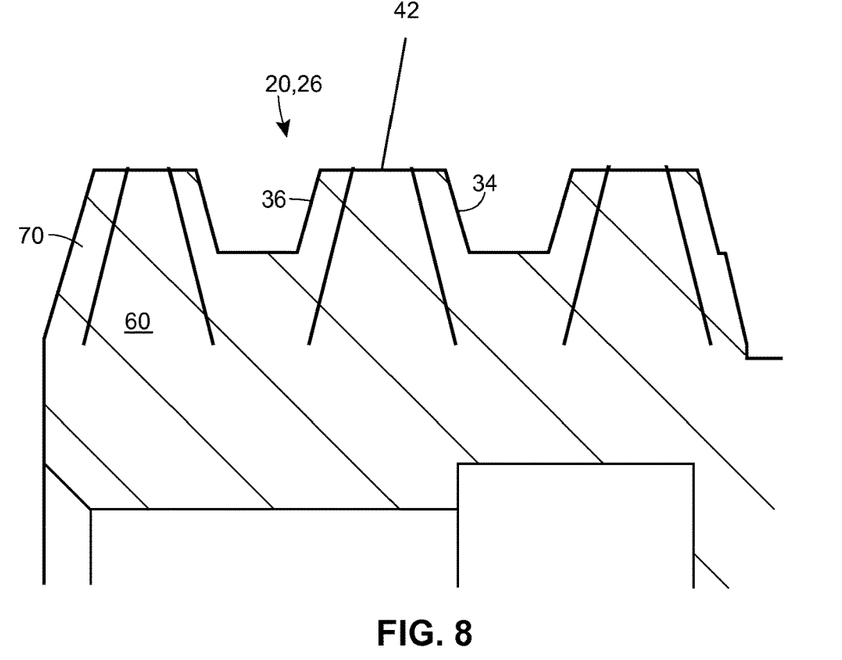
Figure 9:
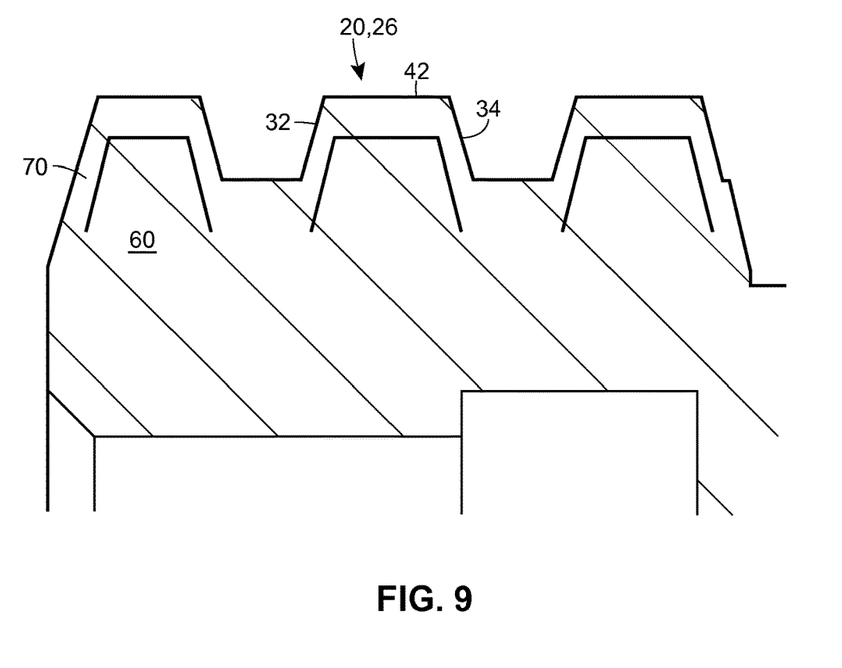

FIGS. 7-9 illustrate another embodiment of a thread wear indicator. In the embodiments of FIGS. 7-9, material that forms the threads may be plated to form several layers. More specifically, the material may have a first layer 60, a second layer 70, and, in some embodiments, a third layer 80 (FIG. 7). More layers may be added if desired. Only two layers may be needed in some embodiments (FIGS. 8 and 9). The layers 60, 70, 80, may be formed generally parallel to either the apex surface 42 (FIG. 7), to the side surfaces 32, 34 (FIG.

8), or to both the apex surface 42 and the side surfaces 32, 34 (FIG. 9). The layers 60, 70, 80, are distinguishable from one another by some physical characteristic. For example, the layers 60, 70, 80, may have different colors or textures. As the top layer wears, an inner layer will gradually become exposed as will be shown by the different physical characteristic of the inner layer. When enough of the inner layer is exposed, the threaded connection is considered unsafe. An additional advantage of the thread wear indicator of FIGS. 7-9 is that locations having the most wear will be exposed first and easily identified. For example, an inner layer being exposed only in a limited area may be indicative of other problems, such as uneven stress or load distribution in the threaded connection. As a result, the disclosed thread wear indicators may facilitate trouble shooting and error analysis for troublesome threaded connections.

Multiple plating techniques may be used to form the thread wear indicators illustrated in FIGS. 7-9. For example, green plating could form the outermost layer and a yellow plating forming an intermediate layer to indicate caution and finally a red inner layer indicates excessive wear and an unsafe condition. Such an arrangement allows time for a user to replace the fitting or judge if the fitting is being abused. In other embodiments, electrical conductivity or lack thereof could be integrated in the fitting plating layers where a signal may be either created or broken when excessive wear has taken place.

Figure 10:
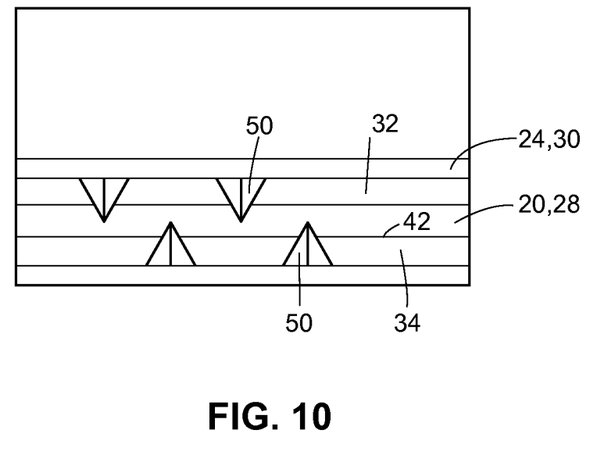
FIG. 10 is a plan view of threads including yet another embodiment of a thread wear indicator.

FIG. 10 illustrates yet another embodiment of a thread wear indicator. In the embodiment of FIG. 10, the thread wear indicator 50 is formed in a side surface 32, 34 of the thread. The thread wear indicator extends radially outward from the valley 24, 30 towards the apex surface 42. As the side surface 32, 34 wears, eventually the thread wear indicator 50 will become indistinguishable from the side surface 32, 34, as in the embodiment of FIGS. 5 and 6. However, as the apex surface 42 wears, the thread wear indicator 50 will become larger and larger. Excessive wear in the apex surface 42 may be defined by the thread wear indicator exceeding a certain measurement. In other embodiments, the thread wear indicators 50 may be separated by a distance that allows one thread wear indicator 50 to merge into an adjacent thread wear indicator 50 when maximum wear is reached.

The thread wear indicators described herein provide a way to detect excessive thread wear before failure. The disclosed thread wear indicators also facilitate timely replacement of worn threads. Other benefits include assistance in troubleshooting troublesome threaded connections.

Although certain trapezoidal thread forms and high pressure connection fittings having trapezoidal thread forms have been described herein in accordance with the teachings of the present disclosure, the scope of the appended claims is not limited thereto. On the contrary, the claims cover all embodiments of the teachings of this disclosure that fairly fall within the scope of permissible equivalents.

The invention claimed is:

1. A trapezoidal thread form comprising:
   a thread having a trapezoidal cross-sectional shape, the thread including an apex surface and two side surfaces; and
   a spiral groove thread wear indicator formed in one of the apex surface and one of the side surfaces, the spiral groove running parallel to a top edge of the thread that is formed by an intersection of the apex surface and one of the side surfaces,
   wherein the thread wear indicator is a v-shaped channel having a depth that is between 5% and 25% of a thickness or height of the trapezoidal thread form.

2. The trapezoidal thread form of claim 1, wherein the v-shaped channel is formed in one of the side surfaces.

3. The trapezoidal thread form of claim 1, wherein the side surfaces are angled with respect to one another.

4. The trapezoidal thread form of claim 3, wherein the side surfaces are angled between 15° and 45°.

5. A trapezoidal thread form comprising:
   a thread having a trapezoidal cross-sectional shape, the thread including an apex surface and two side surfaces; and
   a thread wear indicator formed in one of the side surfaces,
   wherein the thread wear indicator is a v-shaped channel having a depth that is between 5% and 25% of a thickness of the trapezoidal thread form, and
   wherein the v-shaped channel extends radially outward from a valley, a bottom of the v-shaped channel being substantially perpendicular to a top edge of the thread form.

6. A trapezoidal thread form comprising:
   a thread having a trapezoidal cross-sectional shape, the thread including an apex surface and two side surfaces; and
   a thread wear indicator formed in one of the apex surface and one of the side surfaces,
   wherein the thread wear indicator is a layered surface that includes three layers.

7. The trapezoidal thread form of claim 6, wherein each layer has a different physical characteristic.

8. The trapezoidal thread form of claim 7, wherein the physical characteristic is color.

9. The trapezoidal thread form of claim 7, wherein the physical characteristic is texture.

10. The trapezoidal thread form of claim 7, wherein the physical characteristic is electrical conductivity.

11. A threaded connection comprising:
    a male part having an outer thread form;
    a female part having an inner thread form; and
    a spiral groove thread wear indicator disposed on at least one of the outer thread form and the inner thread form, the spiral groove running parallel to a top edge of the outer thread form or of the inner thread form, the top edge being formed by an intersection of an apex surface and a side surface of the outer thread form or of the inner thread form, the thread wear indicator providing a visual indication of excessive thread wear,
    wherein the thread wear indicator is a v-shaped channel having a depth that is between 5% and 25% of a thickness or height of the thread form.

12. The threaded connection of claim 11, wherein one of the outer thread form and the inner thread form is a trapezoidal thread form.

13. A threaded connection comprising:
    a male part having an outer thread form;
    a female part having an inner thread form; and
    a thread wear indicator disposed on at least one of the outer thread form and the inner thread form, the thread wear indicator providing a visual indication of excessive thread wear,
    wherein the thread wear indicator is a v-shaped channel having a depth that is between 5% and 25% of a thickness or height of the thread form, and
    wherein the v-shaped channel is formed in a side surface of one of the outer thread form and the inner thread form and the v-shaped channel extends radially outward from a valley, a bottom of the v-shaped channel being oriented substantially perpendicular to a top edge of the thread form.

14. A threaded connection comprising:
a male part having an outer thread form;
female part having an inner thread form; and
a thread wear indicator disposed on at least one of the outer thread form and the inner thread form, the thread wear indicator providing a visual indication of excessive thread wear,
wherein the thread wear indicator includes at least three layers.

15. The threaded connection of claim 14, wherein each layer has a different physical characteristic.

* * * * *